United States Patent
Kelly et al.

(10) Patent No.: US 12,355,802 B2
(45) Date of Patent: Jul. 8, 2025

(54) METHOD AND SYSTEM FOR VIRTUAL DESKTOP SERVICE MANAGER PLACEMENT BASED ON SECURITY PROFILES

(71) Applicant: Dell Products L.P., Round Rock, TX (US)

(72) Inventors: John Kelly, Mallow (IE); Dharmesh M. Patel, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 264 days.

(21) Appl. No.: 17/970,314

(22) Filed: Oct. 20, 2022

(65) Prior Publication Data

US 2024/0137380 A1 Apr. 25, 2024
US 2024/0236135 A9 Jul. 11, 2024

(51) Int. Cl.
*H04L 9/40* (2022.01)
*G06F 9/455* (2018.01)

(52) U.S. Cl.
CPC .......... *H04L 63/1433* (2013.01); *G06F 9/455* (2013.01); *H04L 63/102* (2013.01)

(58) Field of Classification Search
CPC .... H04L 63/1433; H04L 63/102; G06F 9/455
See application file for complete search history.

(56) References Cited

U.S. PATENT DOCUMENTS

| | | | |
|---|---|---|---|
| 10,063,630 B2* | 8/2018 | Kim | H04L 41/40 |
| 2011/0184993 A1* | 7/2011 | Chawla | G06F 16/182 |
| | | | 718/1 |
| 2012/0284628 A1* | 11/2012 | Wong | H04L 41/5096 |
| | | | 715/736 |
| 2012/0311157 A1* | 12/2012 | Erickson | G06F 9/541 |
| | | | 709/226 |
| 2013/0014033 A1* | 1/2013 | Hamick | G06Q 50/01 |
| | | | 715/757 |
| 2017/0139738 A1* | 5/2017 | Kim | G06F 9/452 |
| 2021/0209254 A1* | 7/2021 | Liggins | G06F 9/452 |

\* cited by examiner

*Primary Examiner* — Daniel B Potratz
*Assistant Examiner* — Faghia Telat Rana
(74) *Attorney, Agent, or Firm* — Chamberlain, Hrdlicka, White, Williams & Aughtry; Aly Z. Dossa

(57) ABSTRACT

A method for managing virtual desktop management placement comprises obtaining, by a virtual desktop management placement service, a request for assigning a virtual desktop service manager to one of a plurality of management environments based on a security profile of the management environment, in response to the request: performing a security profile analysis on the plurality of management environments to assign a management environment to implement the virtual desktop service manager, and initiating a deployment of the virtual desktop service manager on the management environment based on the security profile analysis.

16 Claims, 10 Drawing Sheets

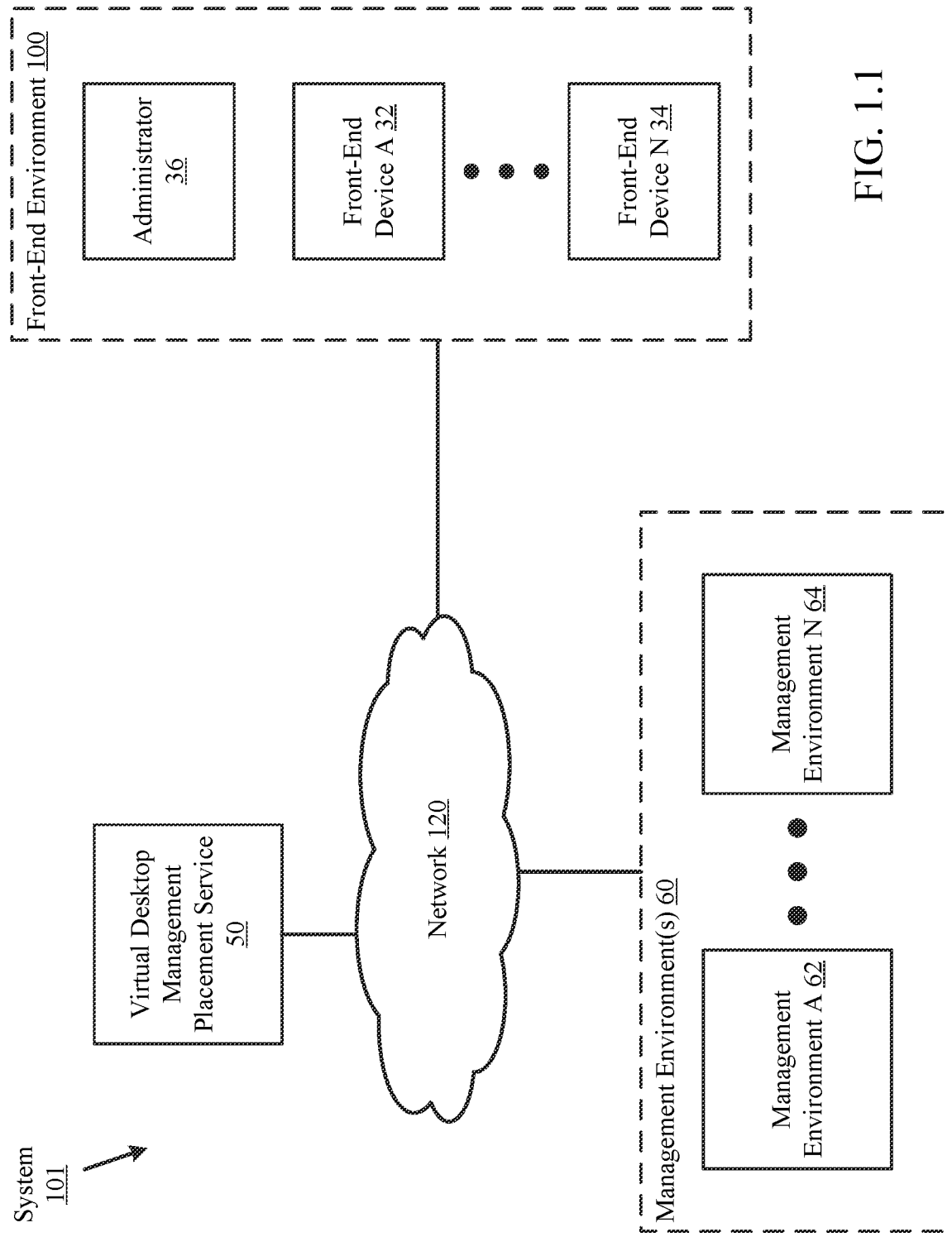
FIG. 1.1

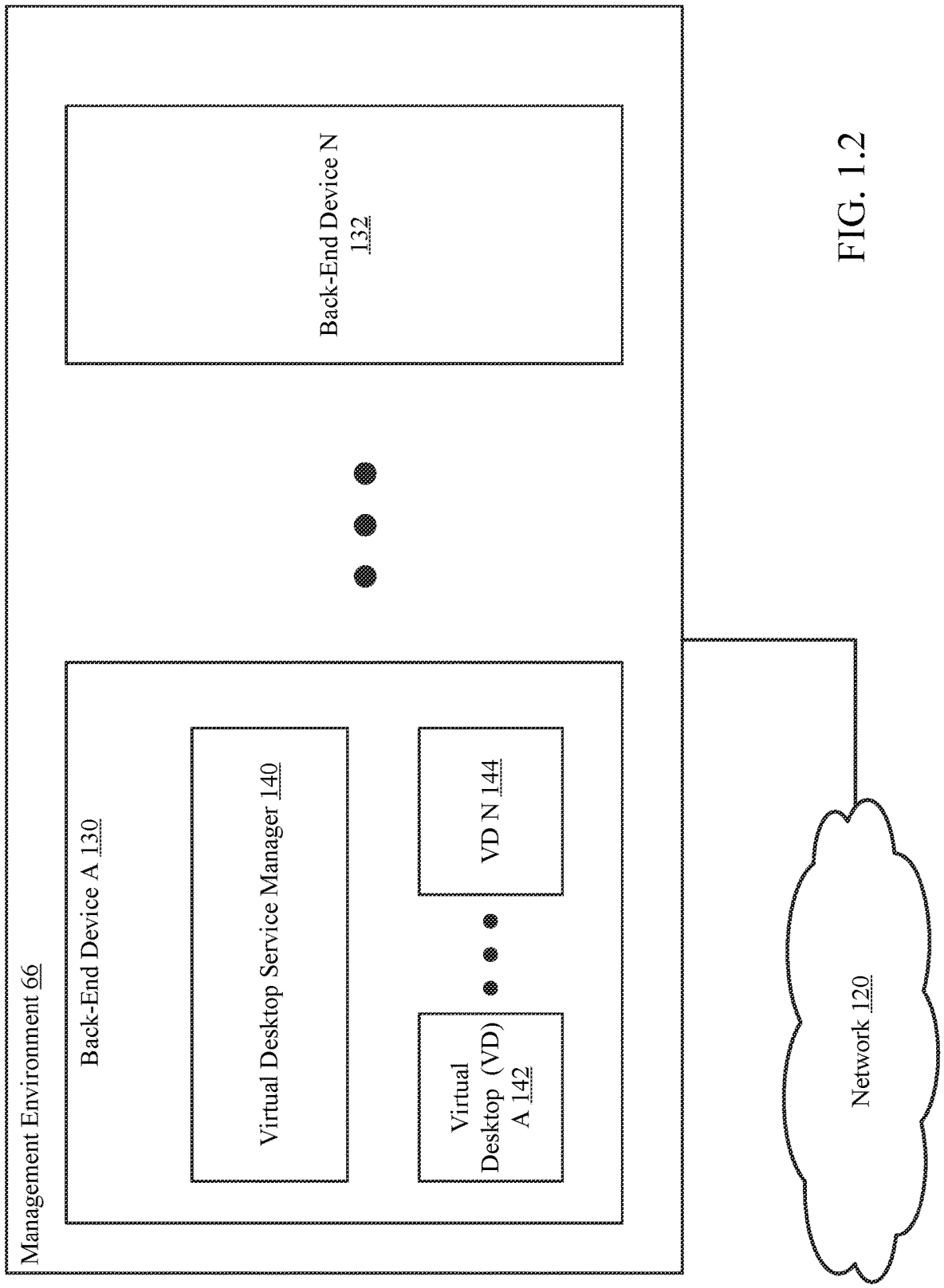
FIG. 1.2

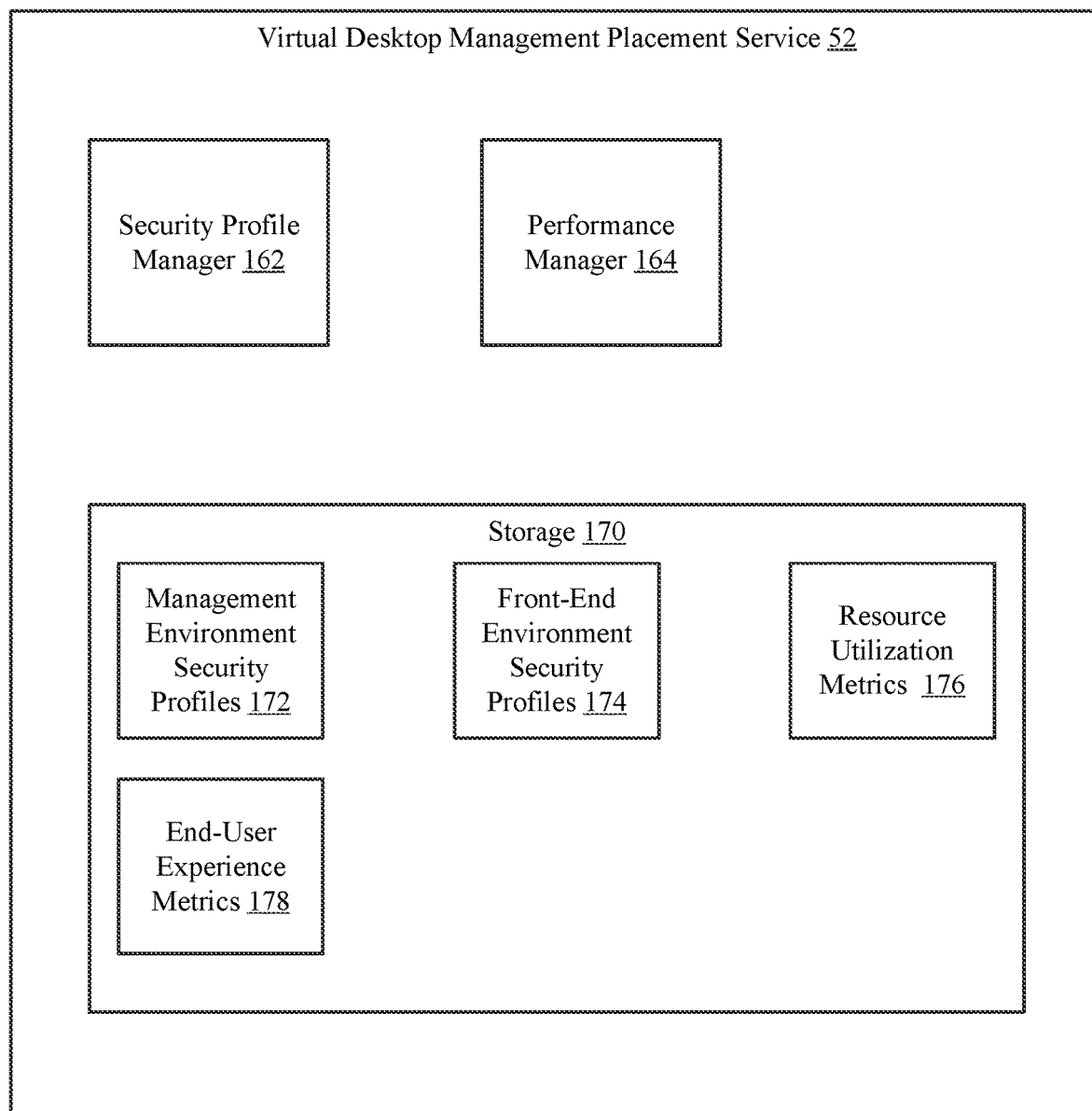
FIG. 1.3

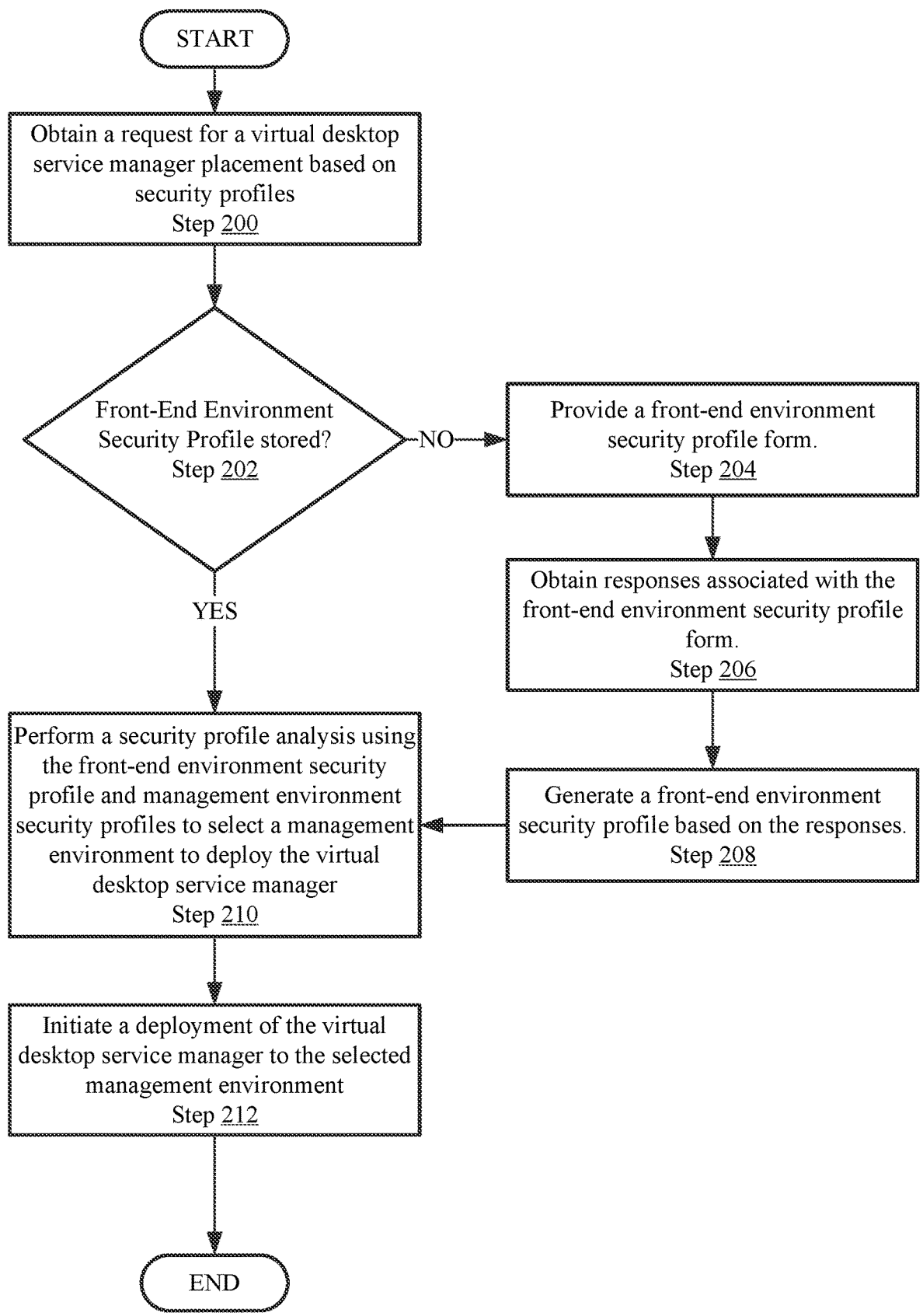
FIG. 2.1

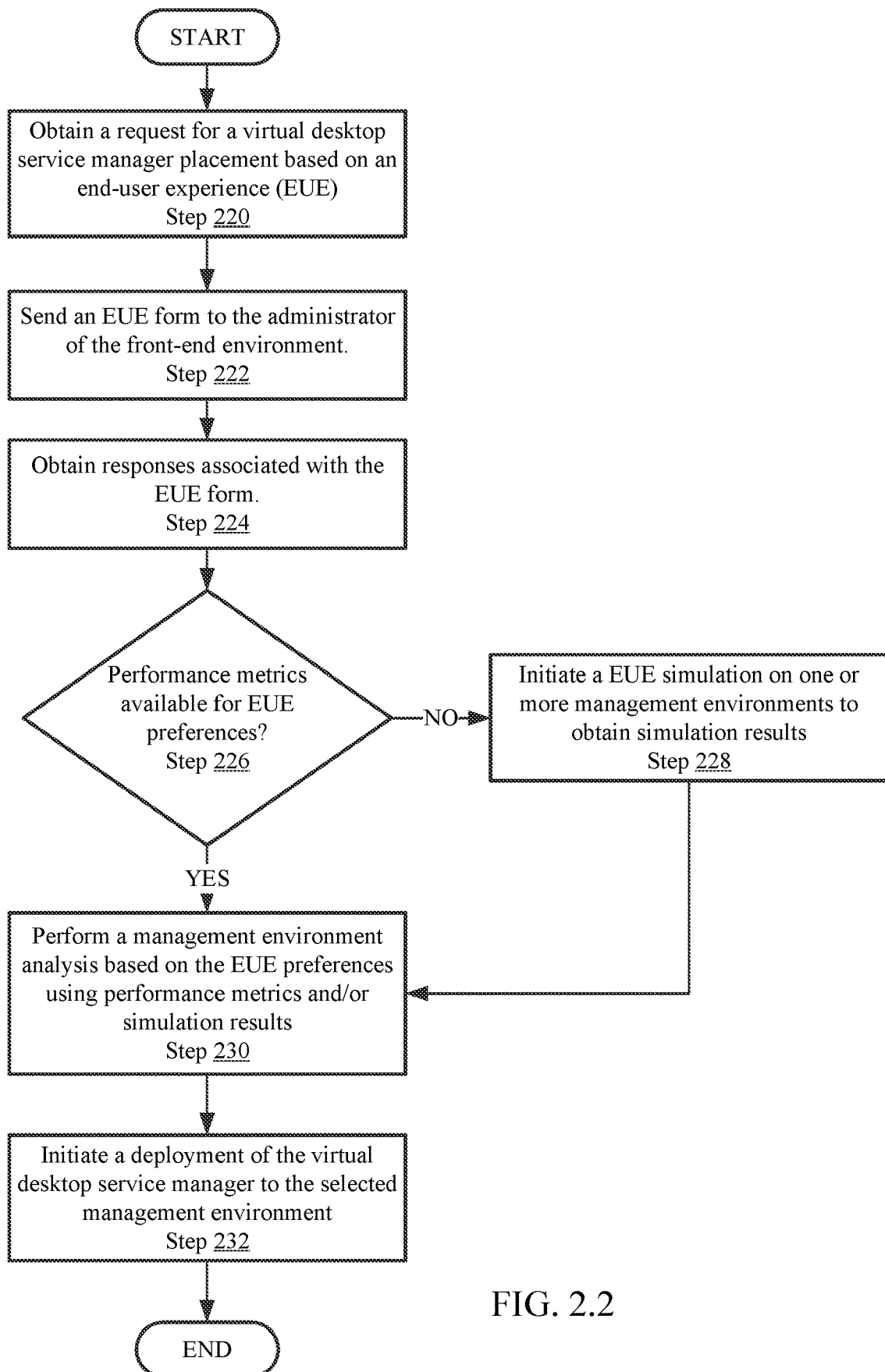
FIG. 2.2

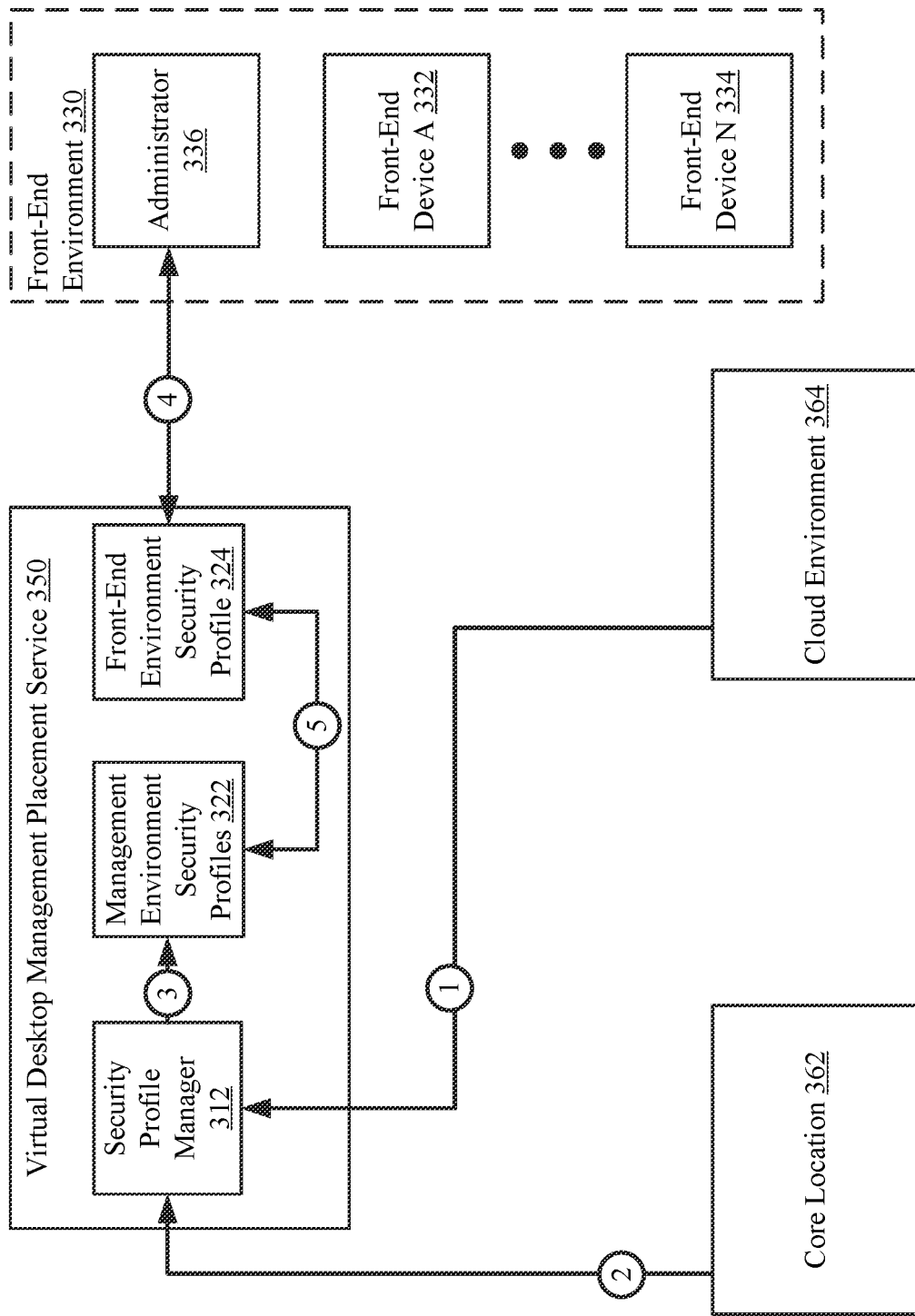
FIG. 3.1

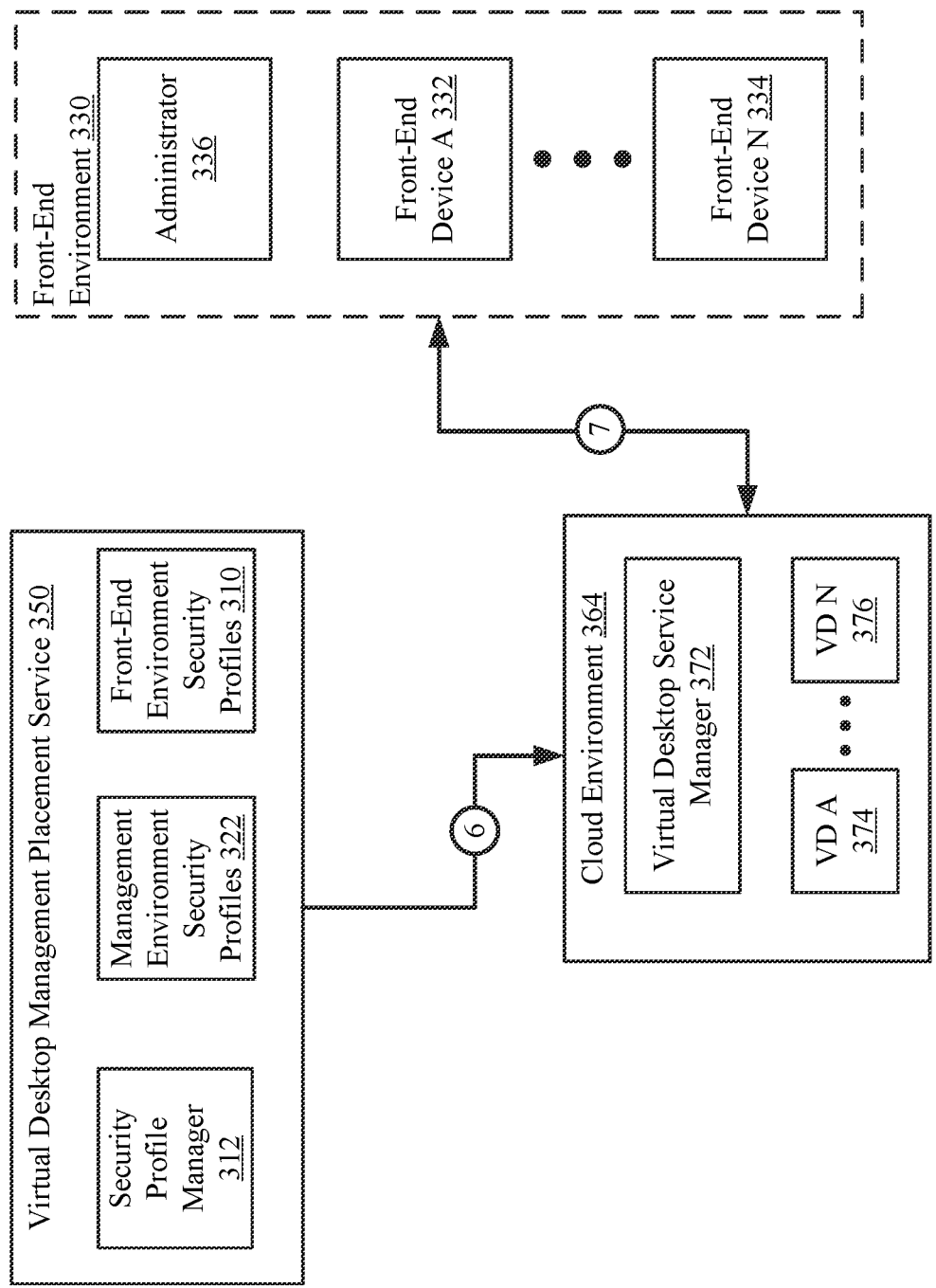
FIG. 3.2

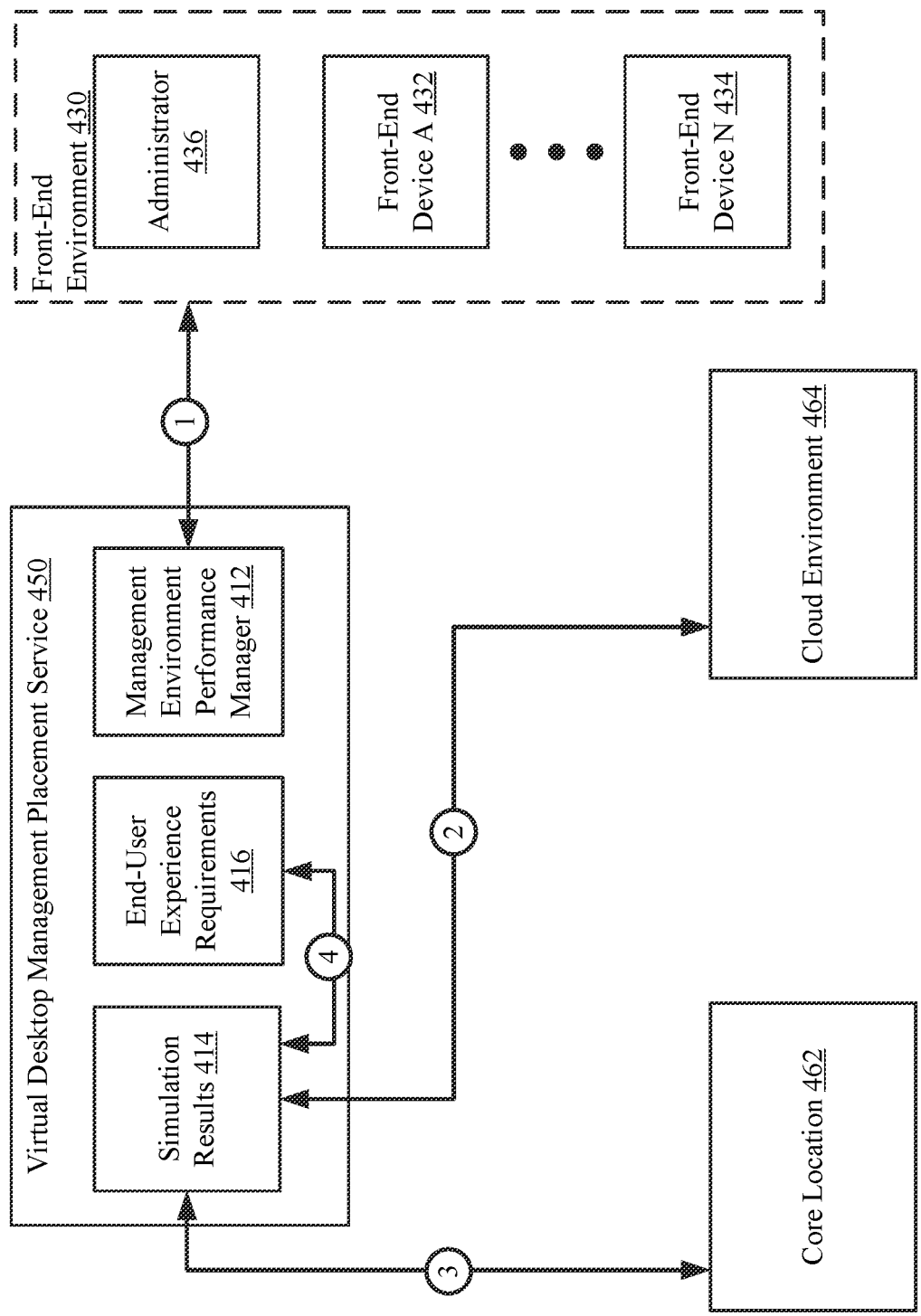
FIG. 4.1

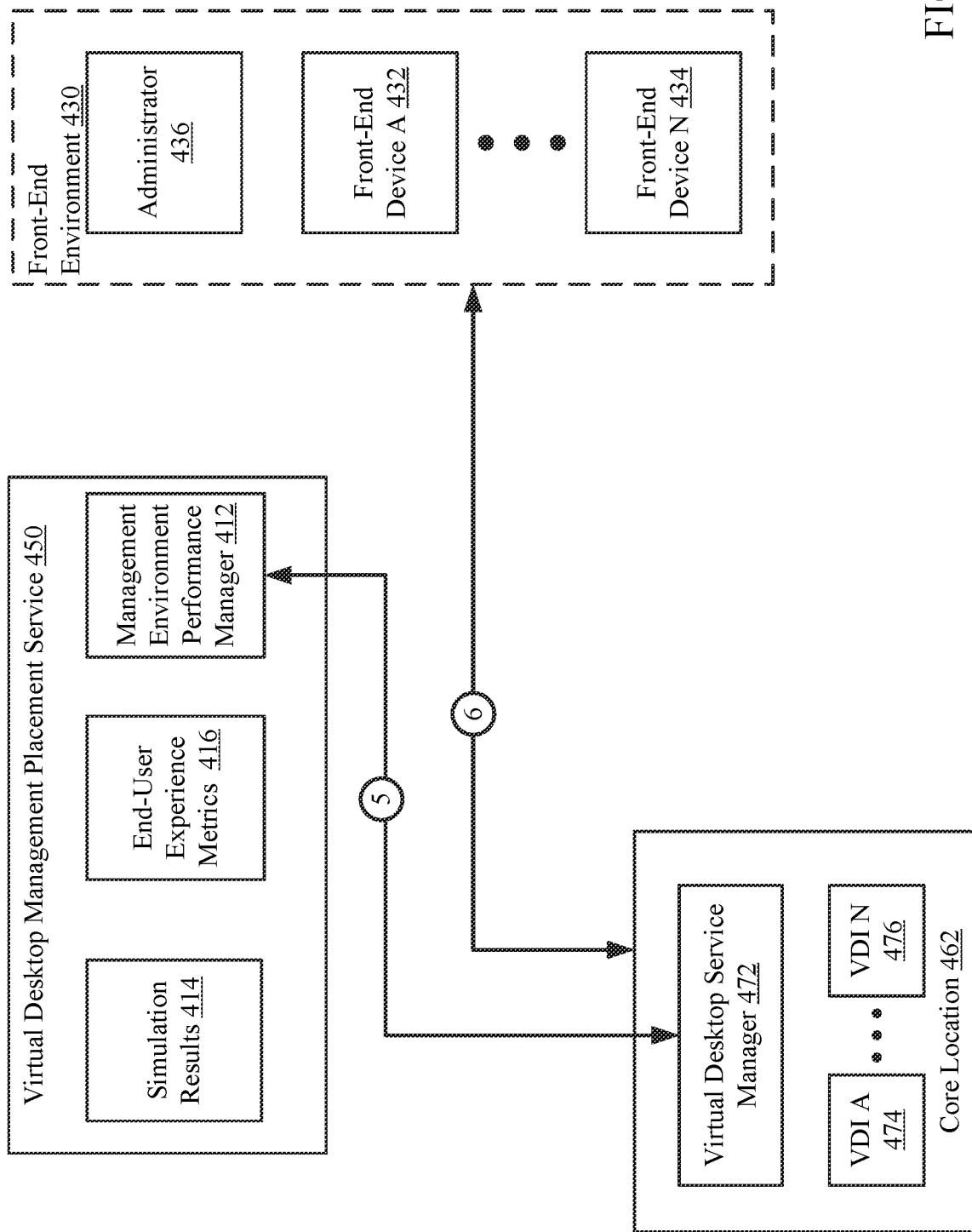
FIG. 4.2

METHOD AND SYSTEM FOR VIRTUAL DESKTOP SERVICE MANAGER PLACEMENT BASED ON SECURITY PROFILES

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a management environment in accordance with one or more embodiments of the invention.

FIG. 1.3 shows a diagram of a virtual desktop management placement service in accordance with one or more embodiments of the invention.

FIG. 2.1 shows a flowchart of a method of determining a virtual desktop management placement based on security profiles in accordance with one or more embodiments of the invention.

FIG. 2.2 shows a flowchart of a method of determining a virtual desktop management placement based on end-user experience in accordance with one or more embodiments of the invention.

FIGS. 3.1-3.2 show a diagram of the operation of an example system over time in accordance with one or more embodiments of the invention.

FIGS. 4.1-4.2 show a diagram of the operation of a second example system over time in accordance with one or more embodiments of the invention.

DETAILED DESCRIPTION

Figure 5:
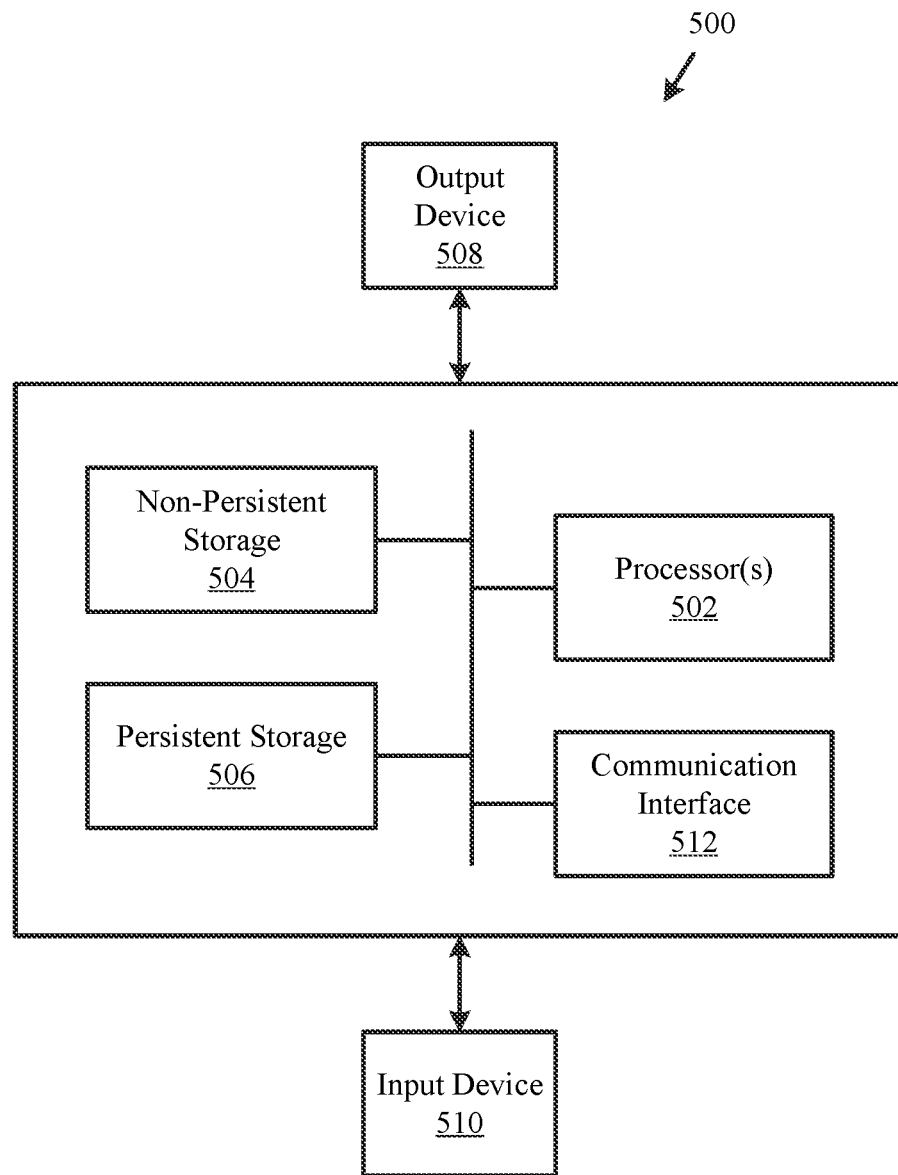
FIG. 5 shows a diagram of a computing device in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, end-users may utilize resources of a front-end environment to access virtual desktops (VDs) that operate in a virtual desktop infrastructure (VDI) environment. The VDs in a VDI environment may be managed by a virtual desktop service manager. The virtual desktop service manager may provide management services to the front-end users. The management services may include, but are not limited to: managing access to the VDs by the front-end users (e.g., via logging on to the VDs), managing the computing resource use by the VDs, managing the security protocols implemented by the VDI environment, and managing the location (e.g., the back-end device) in which the VD is implemented.

In one or more embodiments, the virtual desktop service manager may be located in a management environment. The management environment may be an environment that is external or internal to the front-end environment, without departing from the invention. In one or more embodiments, the placement of the virtual desktop service manager may be determined based on any factors. In one or more embodiments disclosed therein, the placement of the virtual desktop service manager in a management environment is determined based on a security profile of a management environment. In another embodiment, the placement of the virtual desktop service manager in a management environment is determined based on an end-user experience (EUE) of the front-end environment to utilize VDs and the virtual desktop service manager. In another embodiment, the placement of the virtual desktop service manager in a management environment is determined based on computing resource use of a management environment. In another embodiment, the placement of the virtual desktop service manager in a management environment is determined based on the functionality of the management environment.

In the context of one or more embodiments disclosed herein, the term "storage" refers specifically to persistent storage (e.g., non-volatile storage such as, but is not limited to: disk drives, solid-state drives (SSDs), etc.), while the term "memory" refers specifically to non-persistent memory (e.g., volatile memory such as, but is not limited to: random access memory (RAM)).

The following describes various embodiments of the invention.

FIG. 1.1 shows a system in accordance with one or more embodiments of the invention. The system (101) includes a front-end environment (100), a network (120), one or more management environments (60), and a virtual desktop management placement service (50). The system (101) may include additional, fewer, and/or different components without departing from scope of the invention. Each component may be operably connected to any of the other component via any combination of wired and/or wireless connections. Each component illustrated in FIG. 1.1 is discussed below.

In one or more embodiments of the invention, the system (101) may provide computer-implemented services (e.g., real-time network monitoring, backup and disaster recovery, server virtualization, etc.) to users. To provide the computer-implemented services to the users, the system (101) may perform computations locally (e.g., at the front-end environment (100) using the front-end devices (32, 34)) and remotely (e.g., away from the front-end environment (100) using back-end devices (see, e.g., FIG. 1.2)). By doing so, the users may utilize different computing devices (e.g., 500, FIG. 5) that have different quantities of computing resources (e.g., processing cycles, memory, storage, etc.) while still being afforded a consistent end-user experience. For example, by performing computations remotely, the system (101) may maintain the user experience provided by the different computing devices even when the different computing devices possess different quantities of computing resources.

In one or more embodiments of the invention, to provide the aforementioned computer-implemented services, the system (101) may include any number of management environments (60) may be utilized by the users and/or administrators (36). The administrator (36) may be a user with permission to make changes on the front-end environment (100) that will affect other users of that front-end environment (100). However, not all of the users and/or administrators may be allowed to receive all of the aforementioned computer-implemented services.

In one or more embodiments of the invention, the front-end devices (32, 34) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the front-end devices (32, 34) described throughout this application.

Alternatively, in one or more embodiments of the invention, the front-end devices (32, 34) may be implemented as logical devices. A logical device may utilize the computing resources of any number of computing devices to provide the functionality of the front-end devices (32, 34) described throughout this application.

In one or more embodiments of the invention, the above-mentioned system (101) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (101) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

In one or more embodiments of the invention, while communicating with the back-end devices (130, 132, FIG. 1.2) remotely over the network (120), the front-end devices (32, 34) may receive, generate, process, store, and/or transmit data structures (e.g., lists, tables, etc.). In one or more embodiments, the data structures may have a predetermined format in accordance with a communication protocol (e.g., a transmission control protocol (TCP), a user datagram protocol (UDP), etc.) implemented by the front-end devices (100), the network-enabled subcomponents, the network (120), and/or the back-end devices (130).

In one or more embodiments of the invention, one or more of the management environments (62, 64) provide virtual desktop management services. For example, a management environment (62, 64) may provide a virtual desktop service manager (see, e.g., FIG. 1.2) that manages the services of the VDs. One or more of the management environments (62, 64) may store any combination of the virtual desktop service manager and one or more VDs.

In one or more embodiments of the invention, the management environments (60) are each implemented as a logical device. The logical device may utilize the computing resources of any number of back-end devices to provide the functionality of the management environments (62, 64) described throughout this application. For additional details regarding back-end devices and/or management environments (60), see, e.g., FIG. 1.2.

While the management environments (60) are illustrated as separate entities, one or more of the management environments (62, 64) may be a component of the front-end environment (100). For example, a management environment (62, 64) may be a core location that is relatively close geographically to the front-end devices (32, 34). In this example, the core location may include back-end devices owned by the entity that owns the front-end devices (32, 34). In this manner, the core location is a component of the front-end environment (100).

In one or more embodiments, the placement of the virtual desktop service manager in one or more management environments (62, 64) may be managed by a virtual desktop management placement service (50). Specifically, the virtual desktop management placement service (50) may utilize any factors to determine where (e.g., in which management environment (62, 64)) to install the virtual desktop service manager.

In one or more embodiments, the virtual desktop management placement service (50) determines the management environment (62, 64) in which to install the virtual desktop service manager based on security profiles of the management environments (60). For additional details regarding security profiles, see, e.g., FIG. 1.3. In one or more embodiments, the virtual desktop management placement service (50) performs the method of FIG. 2.1 to perform the placement of the virtual desktop service manager based on the security profiles.

In one or more embodiments, the virtual desktop management placement service (50) determines the management environment (62, 64) in which to install the virtual desktop service manager based on the computing resources of the management environments (60). For example, after an initial installation of the virtual desktop service manager in a management environment, the virtual desktop management placement service (50) monitors the computing resource usage of the computing resources in the management environment. The computing resources being monitored may include, for example, the processing components (e.g., central processing units (CPUs), graphics processing units (GPUs), etc.), memory components (e.g., RAM, ROM, etc.), storage capability, network bandwidth, and/or any other resources without departing from the invention. After the monitoring is complete, the measured computing resource use may be input into a machine learning model (e.g., a regression model), and the output may determine whether a reassignment is required. If a reassignment is required, the virtual desktop management placement service (50) may provide, to the administrator (36), a recommendation for a reassignment that includes the recommended new management environment. The reassignment may be performed based on whether the administrator (36) confirms the recommendation.

In one or more embodiments, the virtual desktop management placement service (50) determines the management environment (62, 64) in which to install the virtual desktop service manager based on an end-user experience (EUE) of the end-users utilizing the management environments (60). The virtual desktop management placement service (50) may obtain EUE requirements from the users and determine a management environment (62, 64) that meets the EUE requirements. For additional details regarding EUE requirements, see, e.g., FIG. 1.3. In one or more embodiments, the virtual desktop management placement service (50) performs the method of FIG. 2.2 to perform the placement of the virtual desktop service manager based on the EUE.

In one or more embodiments, the virtual desktop management placement service (50) determines the management environment (62, 64) in which to install the virtual desktop service manager based on functionality of the management environments (60). For example, the virtual desktop management placement service (50) stores a functionality matrix that specifies the features of each virtual desktop service manager of each management environment. The features specified in the functionality matrix may be provided by the management environments (60). The virtual desktop management placement service (50) may query the administrator (36) for the preferred virtual desktop features, and compare the preferences to the functionality matrix to select the preferred management environment.

In one or more embodiments of the invention, the virtual desktop management placement service (50) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the virtual desktop management placement service (50) described throughout this application, including, e.g., the methods of FIGS. 2.1-2.2.

Alternatively, in one or more embodiments of the invention, the virtual desktop management placement service (50) may be implemented as a logical device. The logical device may utilize the computing resources of any number of computing devices to provide the functionality of the virtual desktop management placement service (50) described throughout this application including, e.g., the methods of FIGS. 2.1-2.2. For additional details regarding the virtual desktop management placement service (50), see, e.g., FIG. 1.3.

FIG. 1.2 shows a diagram of a management environment in accordance with one or more embodiments of the invention. The management environment (66) illustrated in FIG. 1.2 may be an embodiment of a management environment (62, 64) discussed in FIG. 1.1. Turning to FIG. 1.2, the management environment (66) includes a set of back-end devices (130, 132). The management environment (66) may include additional, fewer, and/or different components without departing from scope of the invention. Each component may be operably connected to any of the other component via any combination of wired and/or wireless connections. Each component illustrated in FIG. 1.2 is discussed below.

In one or more embodiments of the invention, to provide a consistent user experience, the front-end environment (100, FIG. 1.1) may use a virtual desktop infrastructure (VDI) environment or other types of computing environments that enable remote resources (e.g., back-end devices (130, 132)) to provide computer-implemented services. In one or more embodiments, the computer-implemented services provided by the back-end devices (130) may appear (to the users) to be provided by the front-end devices. In this manner, for example, the front-end devices may be capable of: (i) collecting users' input; (ii) correlating the collected users' inputs to functionalities of the computer-implemented services to be provided to the users; (iii) communicating with the back-end devices (130, 132) that perform the computations necessary to provide the functionalities of the computer-implemented services; and (iv) using the computations performed by the back-end devices (130, 132) to provide the computer-implemented services in a manner that appears to be performed locally to the users.

In one or more embodiments of the invention, while providing different types of computer-implemented services, the front-end environment (100, FIG. 1.1) may communicate with the management environments (60) using different ports (e.g., file transfer protocol (FTP) port 20, network time protocol (NTP) port 123, etc.). In this manner, different functionalities of the computer-implemented services provided by the front-end devices (32, 34, FIG. 1.1) may be dependent on being able to communicate with the back-end devices (130, 132) via different ports. If such communications are made inoperable, the front-end devices may then be prevented from providing functionalities of the computer-implemented services corresponding to the respective ports.

In one or more embodiments of the invention, the back-end devices (130, 132) may provide remote computer-implemented services to the front-end devices. In one or more embodiments, the front-end devices may access the remote computer-implemented services via the VDI environment hosted by the back-end devices (130, 132).

In one or more embodiments of the invention, the VDI environment is a desktop virtualization technology that runs one or more desktop operation systems (OS s) (e.g., an environment through which a user controls a computing device (e.g., 500, FIG. 5)) in a data center. In one or more embodiments, the users of the front-end devices may access an image of the desktop OS (e.g., a virtual desktop (VD) image (142, 144)) remotely over the network (120). In this manner, the users may interact with the desktop OS (including its applications) as if it was running locally in the front-end devices.

In one or more embodiments of the invention, the VD image (142, 144) may refer to a preconfigured image of the desktop OS in which the desktop environment is separated from the computing device (e.g., 500, FIG. 5) used to access it. In one or more embodiments, the accessibility of the users to the VD image (also referred to herein simply as "VD") may depend on a configuration set by the administrators.

In one or more embodiments of the invention, for example, the users may be automatically directed to a login screen of the VD (142, 144) when they are connected to the VDI environment over the network (120). In this scenario, the VD (142, 144) may only be allocated to a specific user (via a VD identifier (not shown)). As another example, the users may need to select a VD (142, 144) from a plurality of VDs (e.g., a VD pool) to launch when they are connected to the VDI environment over the network (120). In this scenario, the users may have access to all of the VDs in the VD pool.

In one or more embodiments of the invention, once the login screen of a VD (142, 144) is displayed, a user accessing the VD may enter the user's credentials (e.g., username, password, etc.) on the login screen. The login screen may be a graphical user interface (GUI) generated by a visualization module (not shown) of the virtual desktop service manager (140). In one or more embodiments, the visualization module may be implemented in hardware (i.e., circuitry), software, or any combination thereof.

In one or more embodiments of the invention, once the user has logged into the VD (142, 144), the user may select one or more applications (e.g., computer programs) and/or may start performing one or more operations (e.g., functions, tasks, activities, etc.) available on the VD (142, 144). Examples of the applications may include, but are not limited to: a word processor, a media player, a web browser, a file viewer, an image editor, etc.

In one or more embodiments of the invention, the applications installed on the VDs (142, 144) may include functionality to request and use computing resources of each VD (142, 144) computing resources (e.g., memory, CPU, storage, network bandwidth (BW), graphics processing unit (GPU), DPU, etc.).

In one or more embodiments of the invention, to be able to provide the computer-implemented services of the VDI environment to the users, the back-end devices (130, 132) may need to install a corresponding front-end device application (e.g., Remote Desktop Protocol (RDP) application, Enlighted Data Transport (EDT) application, etc.) or may need to run a hypertext markup language (e.g., HTML version 5) based session to initiate a remote display protocol. The remote display protocol may include, but it is not limited to: Independent Computing Architecture (ICA), EDT, Blast, Personal Computer over Internet Protocol (PCoIP), RDP, etc.

In one or more embodiments of the invention, the remote display protocol may control the multimedia capabilities (e.g., display, audio, video, etc.) of front-end devices via a multimedia engine (not shown). For example, the multimedia engine may control a display of a front-end device such that a status of an application running on the VD (142, 144) may be displayed in real-time to a user of the front-end device. The status may be displayed in any visual format that would allow the user to easily comprehend (e.g., read and parse) the listed information.

In one or more embodiments of the invention, the multimedia engine is operatively connected to the front-end device. The multimedia engine may be implemented using hardware, software, or any combination thereof.

In one or more embodiments of the invention, to be able to provide the remote computer-implemented services to the front-end devices, the back-end devices (130, 132) may host virtual machines (VMs) (not shown) to run the VDI environment. In one or more embodiments, the VMs may be logical entities executed using computing resources of the back-end devices (130, 132) or using computing resources of other computing devices (e.g., servers, distributed computing systems, cloud resources, etc.) connected to the backend devices (130, 132). Each of the VMs may be performing similar or different processes.

In one or more embodiments of the invention, the VMs (and applications hosted by the VMs) may generate data (e.g., VM data) that is stored in persistent storage (not shown). In one or more embodiments, the VM data may reflect the state of a VM.

In one or more embodiments of the invention, in addition to running the VDI environment, the VMs may provide services to the front-end devices. For example, the VMs may host instances of databases, email servers, or other applications that are accessible to the front-end devices. The VMs may host other types of applications not listed above without departing from the scope of the invention. Moreover, the applications hosted by the VMs may provide application services to the front-end devices (100).

In one or more embodiments of the invention, the VMs may be implemented as computer instructions, e.g., computer code, stored on the persistent storage that when executed by a processor of the back-end devices (130, 132) cause the back-end devices (130, 132) to provide the functionality of the VMs described throughout this application.

In one or more embodiments of the invention, a hypervisor (not shown) may be configured to orchestrate the operation of the VMs by allocating computing resources of the back-end devices (130) to each of the VMs.

In one or more embodiments of the invention, the hypervisor may be a physical device including circuitry. The physical device may be, but it is not limited to: a field-programmable gate array (FPGA), an application-specific integrated circuit, a programmable processor, a microcontroller, a digital signal processor, etc. The physical device may be adapted to provide the functionality of the hypervisor described throughout this application.

Alternatively, in one or more embodiments of the invention, the hypervisor may be implemented as computer instructions, e.g., computer code, stored on the persistent storage that when executed by a processor of the back-end devices (130, 132) cause the back-end devices (130, 132) to provide the functionality of the VMs described throughout this application.

In one or more embodiments of the invention, the virtual desktop service manager (140) may manage the remote computer-implemented services provided by the back-end devices (130, 132) by: (i) identifying the services the back-end devices (130, 132) are to provide (e.g., based on the number of users using the front-end devices); (ii) identifying the ports that the back-end devices (130, 132) utilize to provide the remote computer-implemented services; (iii) providing login services to enable access to the VDs (142, 144) by the front-end devices, and (iv) limiting network communications within the system (101, FIG. 1.1) to only allow the back-end devices (130) to communicate using the ports corresponding to the identified services.

To limit the network communications within the system, the virtual desktop service manager (140) may configure the network-enabled subcomponents. For example, the virtual desktop service manager (140) may: (i) disable some of the ports of the network-enabled subcomponents; (ii) enable other ports of the network-enabled subcomponents (e.g., those ports corresponding to the remote computer-implemented services provided by the back-end devices (130, 132)); and (iii) reduce the communications afforded to the back-end devices (130, 132).

Therefore, while the back-end devices (130, 132) may be capable of performing any number of remote computer-implemented services, they may be limited in providing any number of the remote computer-implemented services over the network (120). For example, the network-enabled subcomponents may prevent the back-end devices (130, 132) from communicating with the front-end devices using certain ports (which are required to provide the remote computer-implemented services that are being limited).

In one or more embodiments of the invention, by configuring the network-enabled subcomponents, the remote computer-implemented services provided to the users of the front-end devices may be granularly configured without modifying the operation(s) of the front-end devices (100).

As discussed throughout the application, the virtual desktop service manager (140) may be installed in one or more of the back-end devices (130, 132) of the management environment (66) based on a determination made by the virtual desktop management placement service (50, FIG. 1.1) in accordance with one or more factors discussed throughout. Such determinations and placements may be made, e.g., in accordance with FIGS. 2.1-2.2.

In one or more embodiments of the invention, the virtual desktop service manager (140) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the virtual desktop service manager (140) described throughout this application.

Alternatively, in one or more embodiments of the invention, similar to the front-end devices, the virtual desktop service manager (140) may also be implemented as a logical device, as discussed above.

In one or more embodiments of the invention, the back-end devices (130, 132) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the back-end devices (130, 132) described throughout this application.

Alternatively, in one or more embodiments of the invention, similar to the front-end devices, the back-end devices (130) may also be implemented as logical devices, as discussed above.

While the virtual desktop service manager (140) is illustrated in FIG. 1.2 as operating in the same management environment (66) as the virtual desktops (142), the virtual desktop service manager (140) may operate in a different environment from the virtual desktops that it manages. For example, the virtual desktops can operate in a core location (e.g., a user-owned data center), and the virtual desktop service manager (140) may operate in a public cloud environment. The virtual desktop service manager (140) and the virtual desktops (142) may operate in other environments without departing from the invention.

As discussed above, the virtual desktop management placement service (50, FIG. 1.1) includes functionality for determining a placement of the virtual desktop service manager (140) based on one or more factors.

Turning now to FIG. 1.3, FIG. 1.3 shows a diagram of a virtual desktop management placement service. The virtual desktop management placement service (52) may be an embodiment of the virtual desktop placement service (50, FIG. 1.1) discussed above. The virtual desktop management placement service (52) includes a security profile manager (162), a performance manager (164), and storage (170). The virtual desktop management placement service (52) may include additional, fewer, and/or different components without departing from scope of the invention. Each component may be operably connected to any of the other component via any combination of wired and/or wireless connections. Each component illustrated in FIG. 1.3 is discussed below.

In one or more embodiments, the security profile manager (162) includes functionality for obtaining security profiles from the front-end environments and the management environments and storing them as front-end environment security profiles (174) and management environment security profiles (172), respectively. In one or more embodiments of the invention, the security profile manager (162) may include functionality for using the management environment security profiles (172) and the front-end security profiles to determine a preferred management environment for the installation (i.e., placement) of the virtual desktop service manager. The determination may be performed, e.g., in accordance with FIG. 2.1.

In one or more embodiments, the management environment security profiles (172) are data structures that each specify a security profile of a management environment. A security profile may refer to descriptions of the management environment that provide an understanding of the security configurations, security capabilities, and/or security functionalities of the management environment. For example, a management environment security profile may specify the number of open ports that provide access to other networks.

As a second example, the management environment security profile may specify a security protocol implemented by the network device for communication with the front-end environment. As a third example, the management environment security profile may specify any encryption operations performed for the storage of data generated by the VDI environment. The management environment security profiles (172) may specify other descriptions without departing from the invention.

In one or more embodiments of the invention, the front-end security profiles (174) specify security preferences of the front-end environment. The security preferences may be obtained by sending a request to an administrator (36, FIG. 1.1) of the front-end environment that specifies completing a front-end environment security profile form. The response(s) of that form may include the security preferences and be used to generate the front-end security profiles (174).

In one or more embodiments of the invention, the performance manager (164) includes functionality for monitoring and tracking the performance of the VDI environment. Specifically, the performance manager (164) may include functionality for monitoring the computing resource usage of a management environment in which the virtual desktop service manager operates. The results of the monitoring may be stored as resource utilization metrics (176) and end-user experience metrics (178).

In one or more embodiments of the invention, the resource utilization metrics (176) are data structures that specify measurements of the resource utilization of computing resources in one or more management environments. The resource utilization metrics (176) specify, for example, processing usage, memory usage, storage utilization, network bandwidth, and/or which VDs in a VDI environment utilize the computing resources during a period of time. Other metrics may be specified in the resource utilization metrics (176) without departing from the invention.

In one or more embodiments of the invention, the end-user metrics (178) are data structures that specify measurements that affect the user's experience. For example, the user's experience may be affected by a logon time (i.e., a time taken for a user to log on to a VD), an application latency of an application in a VD, a display resolution for the VD, and a frequency that the VD disconnects from the front-end devices. The end-user experience may be affected via other metrics without departing from the invention.

FIG. 2.1 shows a flowchart of a method of determining a virtual desktop management placement based on security profiles in accordance with one or more embodiments of the invention. The method shown in FIG. 2.1 may be performed by, for example, a virtual desktop management placement service (e.g., 50, FIG. 1.1). Other components of the system in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

Turning to FIG. 2.1, in step 200, a request for a virtual desktop service manager placement is obtained. In one or more embodiments, the request specifies performing a placement (e.g., selecting a management environment) of a virtual desktop service manager based on security profiles of the management environments. The request may be obtained from an administrator of a front-end environment. The front-end environment may utilize the services of a selected management environment to manage the VDI environment.

In step 202, a determination is made about whether a front-end environment security profile is stored for the front-end environment. If a front-end environment security profile is stored for the front-end environment, the method proceeds to step 210; otherwise, the method proceeds to step 204.

In step 204, following the determination that a front-end environment security profile is not stored, a front-end environment security profile form is provided to an administrator of the front-end environment. In one or more embodiments of the invention, the front-end environment security profile form includes entries to be completed by the administrator for security preferences for the front-end environment. The security preferences may include, for example, a preference for a security protocol implemented by the management environment, a range (e.g., a maximum number) of open ports, a requirement for password complexity for accessing the VDI environment, whether the management environment implements a role-based access control, and whether encryption is implemented on data stored in the management environment for the VDI environment.

In step 206, responses associated with the front-end security profile form are obtained. The responses may specify the security preferences in response to the entries in the front-end security profile form. Further, the responses may specify a ranking or preference system for the security preferences. For example, the responses may specify a ranking for a low number of open ports as the most valuable security preference.

In step 208, a front-end environment security profile is generated based on the responses. In one or more embodiments of the invention, the front-end environment security profile is generated by populating the responses to the front-end security profile form to a data structure. The data structure may be the front-end environment security profile.

In step 210, a security profile analysis is performed using the front-end environment security profile and a management environment security profile to select a management environment. In one or more embodiments of the invention, the security profile analysis includes comparing the security preferences of the front-end environment security profile to each of the management environment security profiles to determine which management environments offer the security preferences. The security profile analysis may further include selecting, from those management environments, a management environment in which to install the virtual desktop service manager.

In step 212, after the management environment is selected, a deployment of the virtual desktop service manager is initiated. In one or more embodiments of the invention, the deployment is initiated by notifying the administrator of the front-end environment of the selection and requesting approval of the selection. If the administrator provides approval, the virtual desktop service manager is installed in the selected management environment. In such embodiments in which the administrator does not approve of the selection, the administrator may specify a second selection (e.g., of a subset of management environments that provide the security preferences discussed above), and deployment may be initiated on the second selection.

In one or more embodiments of the invention, following the deployment of the virtual desktop service manager, the virtual desktop management placement service may monitor the computing resource usage of the computing resources in the management environment. The monitoring may include storing resource utilization metrics. The resource utilization metrics may be input into a machine learning model (e.g., a regression model), and the output may determine whether a reassignment is required. If a reassignment is required, the virtual desktop management placement service may provide a recommendation to the administrator for a reassignment that includes the recommended new management environment. The reassignment may be performed based on whether the administrator confirms the recommendation.

FIG. 2.2 shows a flowchart of a method of determining a virtual desktop management placement based on end-user experience in accordance with one or more embodiments of the invention. The method shown in FIG. 4.2 may be performed by, for example, the virtual desktop management placement service (e.g., 50, FIG. 1.1). Other components of the system in FIG. 1.1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

In step 220, a request for a virtual desktop service manager placement is obtained. In one or more embodiments, the request specifies performing a placement (e.g., selecting a management environment) of a virtual desktop service manager based on an end-user experience (EUE) of the management environments. The request may be obtained from an administrator of a front-end environment. The front-end environment may utilize the services of a selected management environment to manage the VDI environment.

In step 222, an EUE form is sent to the administrator of the front-end environment. In one or more embodiments of the invention, the EUE form includes entries to be completed by the administrator for EUE requirements for the front-end environment. The EUE requirements may include, for example, a requirement for a maximum logon time, a requirement for a maximum application latency, a requirement for a display resolution for the VD, and a requirement for a maximum frequency that the VD disconnects from the front-end environment. Further, the EUE form may request obtaining a ranking of the EUE requirements. For example, the EUE form may specify requesting which of the EUE requirements are most valuable to the administrator.

In step 224, responses associated with the EUE form are obtained. In one or more embodiments of the invention, the responses provide the EUE requirements for the VDI environment as specified by the administrator.

In step 226, a determination is made about whether performance metrics are available for EUE preferences. As discussed above, the performance metrics (e.g., the EUE metrics (172, FIG. 1.3) may specify any measurements of the management environment that measure the EUE performance of the management environment. If available, the EUE metrics may specify for all, or a portion thereof, of the management environments in the system. If the performance metrics are available for EUE preferences, the method proceeds to step 230, otherwise the method proceeds to step 228.

In step 228, following the determination that the performance metrics are not available for the EUE preferences, an EUE simulation is initiated on one or more management environments to obtain simulation results. In one or more embodiments of the invention, the EUE simulation is a process for executing a VDI environment without the front-end environment to measure, calculate, or otherwise estimate the behavior of the VDI environment for a management environment. The EUE simulation may be repeated for each management environment being measured. The generated measurements, calculations, and/or estimations may be stored as the simulation results.

In step 230, a management environment analysis is performed based on the EUE requirements using performance metrics and/or simulation results. In one or more embodiments of the invention, the management environment analysis includes comparing the EUE requirements of the front-end environment to either the simulation results (generated in step 228) or previously generated performance metrics associated with each management environment to determine which management environment(s) offer the EUE requirements. The management environment analysis may further include selecting, from those management environments, a management environment in which to install the virtual desktop service manager.

In step 232, a deployment of a virtual desktop service manager to a selected management environment is initiated. Similar to step 212 of FIG. 2.1, the deployment may be initiated by notifying the administrator of the front-end environment of the selection and requesting approval of the selection. If the administrator provides approval, the virtual desktop service manager is installed in the selected management environment. In such embodiments in which the administrator does not approve of the selection, the administrator may specify a second selection (e.g., of a subset of management environments that provide the EUE requirements discussed above), and deployment may be initiated on the second selection.

To further clarify embodiments of the invention, two non-limiting examples are provided in FIGS. 3.1-3.2 and FIGS. 4.1-4.2. For the sake of brevity, only a limited number of components of the system of FIGS. 1.1-3.2 are illustrated in FIGS. 3.1-3.2 and FIGS. 4.1-4.2. FIGS. 3.1-3.2 and FIGS. 4.1-4.2 may illustrate processes labeled using circled numbers and described using brackets in numbers (e.g., "[1]").

Example 1

Consider a scenario in which a front-end environment would like to utilize the services of a management environment for the use of virtual desktops. The determination of which management environment to utilize is determined based on a security profile of the management environment.

Turning to FIG. 3.1, FIG. 3.1 shows a diagram of an example system. The example system includes a virtual desktop management placement service (350) that implements a security profile manager (312). A cloud environment (364) is an eligible contender for the management environment. The cloud environment (364) provides a management environment security profile to the security profile manager (312) [1]. The management profile security profile specifies the security capabilities of the cloud environment (364), including the password complexity offered by the cloud environment (364). A core location (362) is a data center that houses back-end devices geographically near the front-end environment (330). The core location (362) is another eligible contender for the management environment. The core location (362) sends a second management environment security profile to the security profile manager (312) [2]. The core location (362) specifies the security capabilities of the core location, including the encryption of stored data in the core location (362). The management environment security profiles (322) are stored in the virtual desktop management placement service (350).

At a later point in time, an administrator (336) of the front-end environment (330) sends a request for installing a virtual desktop service manager based on the security profiles. The administrator (336) obtains a front-end environment security profile form from the virtual desktop management placement service (350) and provides the responses in accordance with FIG. 2.1 [4]. Specifically, the responses specify security preferences including a high password complexity requirements.

In response to receiving the responses, the responses are stored as a front-end security profile (324) in the virtual desktop management placement service (350). Based on obtaining the front-end environment security profile (324), a security profile analysis is performed, in accordance with FIG. 2.1, and using the management environment security profiles (322) and the front-end environment security profiles (324) [5]. Based on the security profile analysis, the virtual desktop management placement service (350) determines that, of the two eligible contenders of the management environments, the cloud environment (364) is the preferred management environment. Based on the determination, the cloud environment is selected.

Turning to FIG. 3.2, FIG. 3.2 shows a second diagram of the example system. The virtual desktop management placement service (350) installs the virtual desktop service manager (372) in the cloud environment (364) [6]. Following the installation, the front-end environment (330) accesses the VDI environment using the front end devices (332, 334) and the VDs (374, 376) in the cloud environment (364). The access to the VDs (374,376) are managed by the installed virtual desktop service manager (372).

End of Example 1

Example 2

Consider a scenario in which a front-end environment would like to utilize the services of a management environment for the use of virtual desktops. The determination of which management environment to utilize is determined based on an end-user experience (EUE) of the users in the front-end environment.

Turning to FIG. 4.1, FIG. 4.1 shows a diagram of a second example system. The second example system includes a virtual desktop management placement service (450) that implements a management environment performance manager (412). The management environment performance manager (412) communicates with the front-end environment (430) to obtain EUE requirements for the EUE [1]. The EUE requirements specify a decreased logon time (i.e., a low period of time required to log on to the VDI environment).

A cloud environment (464) is an eligible contender for the management environment. Based on the EUE requirements, the virtual desktop management placement service (450) initiates a simulation on the cloud environment to test the logon time of the cloud environment (464) [2]. The simulation includes attempting to log on to the VDI environment using the cloud environment (464) and measuring the logon times. A core location (462) is a data center that houses back-end devices geographically near the front-end environment (430). The core location (462) is another eligible contender for the management environment. The simulation is repeated for the core location (462) [3]. The simulation results (414) are stored in the virtual desktop management placement service (450).

After obtaining the simulation results (414), a management environment analysis is performed in accordance with FIG. 2.2, and using the simulation results and the end-user experience requirements (416) [4]. Based on the management environment analysis, the virtual desktop management placement service (450) determines that, of the two eligible contenders of the management environments, the core location (462) is the preferred management environment. Based on the determination, the core environment is selected.

Turning to FIG. 4.2, FIG. 4.2 shows a second diagram of the second example system. The virtual desktop management placement service (450) installs the virtual desktop service manager (472) in the core location (462) [5]. Following the installation, the front-end environment (430) accesses the VDI environment using the front end devices (332, 334) and the VDs (474, 476) in the core environment (464). The access to the VDs (474, 476) are managed by the installed virtual desktop service manager (472).

End of Example 2

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for providing management placement services for a virtual desktop. Embodiments disclosed herein provide methods for determining (e.g., selecting) a management environment based on a set of factors. One of the set of factors may include security profiles of the management environments. Determining the management environment based on security profiles provides an improved security experience for the front-end environment. In this manner, the security preferences of the users utilizing a VDI environment may be serviced by the management environment when implementing the virtual desktop service manager.

Another of the set of factors may include computing resource usage of the management environments. Embodiments disclosed herein may reassign management services based on a misuse of the computing resources. By performing the reassignment, the efficiency of computing resource use is improved in a system with multiple management environments.

Another of the set of factors may include end-user experience. Improving the end user experience results in lower latency and a more efficient use of the computing resources of the users. By improving the experience of the user, embodiments disclosed herein improve the overall efficiency of the use of the system.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing virtual desktop management placement, the method comprising:
  obtaining, by a virtual desktop management placement service, a request for assigning a virtual desktop service manager to one of a plurality of management environments based on a security profile of a management environment in the plurality of management environments;
  in response to the request:
    performing a security profile analysis on the plurality of management environments to assign the management environment to implement the virtual desktop service manager,
      wherein the plurality of management environments comprises a first management environment and a second management environment,
      wherein the security profile analysis comprises selecting, between the first management environment and the second management environment, placement of the management environment based on a first security profile of the first management environment and a second security profile of the second management environment,
      wherein the first management environment is a core location data center owned by a user interfacing with the virtual desktop management placement service via a front-end environment, and
      wherein the second management environment is a public cloud environment operatively connected to the front-end environment via a wide area network; and
    initiating a deployment of the virtual desktop service manager on the management environment based on the security profile analysis,
      wherein the virtual desktop service manager manages remote computer-implemented services to be provided by backend devices to the front-end environment, operated by a user, and
      wherein the management environment in which the virtual desktop service manager is deployed is in a different environment from the backend devices, and
      wherein the management environment is one of the first management environment or the second management environment.

2. The method of claim 1, wherein performing the security profile analysis comprises:
  sending a front-end environment security profile form to an administrator of the front-end environment; and
  obtaining a response to the front-end environment security profile form, wherein the response comprises a front-end environment security profile, and
  wherein initiating the deployment comprises installing the virtual desktop service manager in the management environment based on the front-end environment security profile.

3. The method of claim 2, wherein the virtual desktop service manager manages a virtual desktop infrastructure environment using the management environment.

4. The method of claim 2, wherein the front-end environment security profile comprises at least one of: a number of open ports for accessing the front-end environment, a security protocol preference, a password complexity requirement for accessing the virtual desktop service manager, and an encryption requirement.

5. The method of claim 2, wherein performing the security profile analysis further comprises comparing the front-end environment security profile to each of the plurality of management environments to determine that a security profile of the management environment is compatible with the front-end environment security profile.

6. The method of claim 1, further comprising:
  after initiating the deployment of the virtual desktop service manager on the management environment:
    monitoring resource utilization of the management environment for implementing the virtual desktop service manager;
    making a determination that the resource utilization has reached a utilization threshold; and
    based on the determination, assigning a third management environment of the plurality of management environments for implementing the virtual desktop service manager; and
    initiating a second deployment of the virtual desktop service manager on the second management environment.

7. A non-transitory computer readable medium comprising computer readable program code, which when executed by a computer processor enables the computer processor to perform a method for managing information handling systems, the method comprising:
  obtaining, by a virtual desktop management placement service, a request for assigning a virtual desktop service manager to one of a plurality of management environments based on a security profile of a management environment in the plurality of management environments;

in response to the request:

performing a security profile analysis on the plurality of management environments to assign the management environment to implement the virtual desktop service manager, wherein the plurality of management environments comprises a first management environment and a second management environment, wherein the security profile analysis comprises selecting, between the first management environment and the second management environment, placement of the management environment based on a first security profile of the first management environment and a second security profile of the second management environment, wherein the first management environment is a core location data center owned by a user interfacing with the virtual desktop management placement service via a front-end environment, and wherein the second management environment is a public cloud environment operatively connected to the front-end environment via a wide area network; and initiating a deployment of the virtual desktop service manager on the management environment based on the security profile analysis, wherein the virtual desktop service manager manages remote computer-implemented services to be provided by backend devices to the front-end environment, wherein the management environment in which the virtual desktop service manager is deployed is in a different environment from the backend devices, and wherein the management environment is one of the first management environment or the second management environment.

8. The non-transitory computer readable medium of claim 7, wherein performing the security profile analysis comprises:

sending a front-end environment security profile form to an administrator of the front-end environment; and obtaining a response to the front-end environment security profile form, wherein the response comprises a front-end environment security profile, and wherein initiating the deployment comprises installing the virtual desktop service manager in the management environment based on the front-end environment security profile.

9. The non-transitory computer readable medium of claim 8, wherein the virtual desktop service manager manages a virtual desktop infrastructure environment using the management environment.

10. The non-transitory computer readable medium of claim 8, wherein the front-end environment security profile comprises at least one of: a number of open ports for accessing the front-end environment, a security protocol preference, a password complexity requirement for accessing the virtual desktop service manager, and an encryption requirement.

11. The non-transitory computer readable medium of claim 8, wherein performing the security profile analysis further comprises comparing the entity front-end environment security profile to each of the plurality of management environments to determine that a security profile of the management environment is compatible with the entity front-end environment security profile.

12. The non-transitory computer readable medium of claim 7, the method further comprising:

after initiating the deployment of the virtual desktop service manager on the management environment:

monitoring resource utilization of the management environment for implementing the virtual desktop service manager;

making a determination that the resource utilization has reached a utilization threshold; and based on the determination, assigning a second third management environment of the plurality of management environments for implementing the virtual desktop service manager; and initiating a second deployment of the virtual desktop service manager on the second management environment.

13. A system, comprising:

a processor; and memory including instructions, which when executed by the processor, perform a method comprising:

obtaining, by a virtual desktop management placement service, a request for assigning a virtual desktop service manager to one of a plurality of management environments based on a security profile of a management environment in the plurality of management environments;

in response to the request:

performing a security profile analysis on the plurality of management environments to assign the management environment to implement the virtual desktop service manager, wherein the plurality of management environments comprises a first management environment and a second management environment, wherein the security profile analysis comprises selecting, between at least the first management environment and the second management environment, placement of the management environment based on a first security profile of the first management environment and a second security profile of the second management environment, wherein the first management environment is a core location data center owned by a user interfacing with the virtual desktop management placement service via a front-end environment, and wherein the second management environment is a public cloud environment operatively connected to the front-end environment via a wide area network; and initiating a deployment of the virtual desktop service manager on the management environment based on the security profile analysis, wherein the virtual desktop service manager manages remote computer-implemented services to be provided by backend devices to the front-end environment, wherein the management environment in which the virtual desktop service manager is deployed is in a different environment from the backend devices, and wherein the management environment is one of the first management environment or the second management environment.

14. The system of claim 13, wherein performing the security profile analysis comprises:
   sending a front-end environment security profile form to an administrator of the front-end environment; and
   obtaining a response to the front-end environment security profile form, wherein the response comprises a front-end environment security profile, and
   wherein initiating the deployment comprises installing the virtual desktop service manager in the management environment based on the front-end environment security profile.

15. The system of claim 14, wherein the virtual desktop service manager manages a virtual desktop infrastructure environment using the management environment.

16. The system of claim 14, wherein the front-end environment security profile comprises at least one of: a number of open ports for accessing the front-end environment, a security protocol preference, a password complexity requirement for accessing the virtual desktop service manager, and an encryption requirement.

* * * * *